United States Patent
Lin

(10) Patent No.: US 7,042,533 B2
(45) Date of Patent: May 9, 2006

(54) LCD MODULE CONNECTING MECHANISM COMPRISING AN ARM CONNECTED TO A FRAME BY INSERTING A HOOK OF THE ARM THROUGH FIRST AND SECOND OPENINGS FORMED ON A LATERAL SURFACE OF THE FRAME

(75) Inventor: Ching-Huang Lin, Penghu (TW)

(73) Assignee: Toppoly Optoelectronics Corp., Chun-Nan (TW)

( * ) Notice: Subject to any disclaimer, the term of this patent is extended or adjusted under 35 U.S.C. 154(b) by 40 days.

(21) Appl. No.: 10/612,858

(22) Filed: Jul. 3, 2003

(65) Prior Publication Data

US 2005/0001948 A1    Jan. 6, 2005

(51) Int. Cl.
*G02F 1/1333*    (2006.01)

(52) U.S. Cl. .......................................... 349/58; 349/60

(58) Field of Classification Search ............... 349/58, 349/60, 150
See application file for complete search history.

(56) References Cited

U.S. PATENT DOCUMENTS

| | | | | |
|---|---|---|---|---|
| 5,905,550 A | * | 5/1999 | Ohgami et al. | 349/58 |
| 6,411,352 B1 | * | 6/2002 | Kim | 349/58 |
| 6,618,240 B1 | * | 9/2003 | Kim | 361/681 |
| 6,816,212 B1 | * | 11/2004 | Lin et al. | 349/58 |

FOREIGN PATENT DOCUMENTS

| | | |
|---|---|---|
| JP | 6322756 | 2/1988 |
| JP | 9297542 | 11/1997 |
| JP | 10266499 | 10/1998 |
| JP | 2001-305985 | 11/1998 |
| JP | 10333585 | 12/1998 |
| WO | WO 03/009263 A1 | 1/2003 |

* cited by examiner

*Primary Examiner*—Andrew Schechter
*Assistant Examiner*—Thoi V. Duong
(74) *Attorney, Agent, or Firm*—Quintero Law Office

(57) ABSTRACT

An LCD module connecting mechanism. An LCD module connecting mechanism for an electronic device comprising an arm disposed in the electronic device and a frame disposed on a side of the LCD module. The arm has a first joining portion disposed on a side thereof. The frame has a second joining portion on a side thereof. The LCD module connects the electronic device by joining the first joining portion and the second joining portion.

10 Claims, 4 Drawing Sheets

LCD MODULE CONNECTING MECHANISM COMPRISING AN ARM CONNECTED TO A FRAME BY INSERTING A HOOK OF THE ARM THROUGH FIRST AND SECOND OPENINGS FORMED ON A LATERAL SURFACE OF THE FRAME

BACKGROUND OF THE INVENTION

1. Field of the Invention

The present invention relates to an LCD (Liquid Crystal Display) module connecting mechanism, and in particular to an LCD module connecting mechanism for an electronic device securing the LCD module therein.

2. Description of the Related Art

With the popularity of internet and the progress in functions and portability of electronic products, such electronic products like the well-known notebook computers have become increasingly popular. Generally in a notebook computer, a main body and a display unit are provided with an LCD module therein, wherein the main body and the display unit are joined by a hinge. Several designs for accomplishing this object have been disclosed in the prior art.

With respect to U.S. Pat. No. 5,872,606, discloses a method of mounting an LCD module and apparatus thereof. Referring to FIG. 1, a notebook computer comprises a main body housing 1 and a display unit housing 2. A fixed rod 5 is mounted on the main body housing 1 by the screws 6. Furthermore, the LCD module 4 is mounted in the display unit housing 2 by inserting the screws 6' through the display unit housing 2, the arm 3a and the protecting rod 4a on a side of the LCD module 4. A hinge 3 is provided to connect the arm 3a and the fixed rod 5 such that the display unit and the main body are joined together.

According to U.S. Pat. No. 5,872,606, however, mounting the LCD module 4 with the screws 6' increases not only the cost but also the time and complexity of the assembly process. Moreover, such an apparatus must provide extra space to receive the screws. Therefore, it is important to discover a method of mounting the LCD module which requires less space, offers lower cost, and simplifies the assembly process.

SUMMARY OF THE INVENTION

An object of the invention is to provide an LCD module connecting mechanism for an electronic device requiring less space, offers lower cost, and simplifies the assembly process.

The LCD module connecting mechanism for an electronic device comprises an arm disposed in the electronic device and a frame disposed on a side of the LCD module. The arm has a first joining portion disposed on a side thereof. The frame has a second joining portion on a side thereof. The LCD module connects the electronic device by joining the first joining portion and the second joining portion.

In embodiments of the present invention, the LCD module connecting mechanism for connecting an LCD module to an electronic device comprises a fixing member and a frame disposed on a side of the LCD module. The fixing member comprises a hook extending from a side thereof. The frame has a first opening and a second opening both on a lateral surface thereof. The fixing member and the frame are connected by inserting the hook through the first opening with the tail of the hook located at the second opening.

In preferred embodiments, the hook extends from a surface of the fixing member and comprises a first portion and a tail portion transverse to the first portion, wherein the first portion and tail portion of the hook are inserted through the first opening and the tail portion is received by the second opening. The tail portion preferably extends from the first portion in a direction towards the surface of the fixing member. The hook preferably comprises a second portion, the second portion extending from the surface of the fixing member, wherein the first portion extends from the second portion transverse to the second portion. A portion of the frame between the first hole and the second hole is preferably received in a space defined by the second portion, the first portion, and the tail. The fixing member may be connected to the electronic device via a hinge. The fixing member may also be a portion of a housing covering the electronic device.

In a first preferred embodiment, an LCD module connecting mechanism for connecting an LCD module to an electronic device comprises an arm having a hook extending from a side thereof, the arm connected to the electronic device, and a frame disposed on a side of the LCD module, the frame having a first opening and a second opening both on a lateral surface thereof. The arm and the frame are connected by inserting the hook through the first opening with the tail of the hook located at the second opening.

In a second preferred embodiment, an LCD module connecting mechanism for connecting an LCD module to an electronic device comprises a housing covering the electronic device, the housing having a hook extending from a side thereof, and a frame disposed on a side of the LCD module, the frame having a first opening and a second opening both on a lateral surface thereof. The housing and the frame are connected by inserting the hook through the first opening with the tail of the hook located at the second opening.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

First Embodiment

Figure 1:
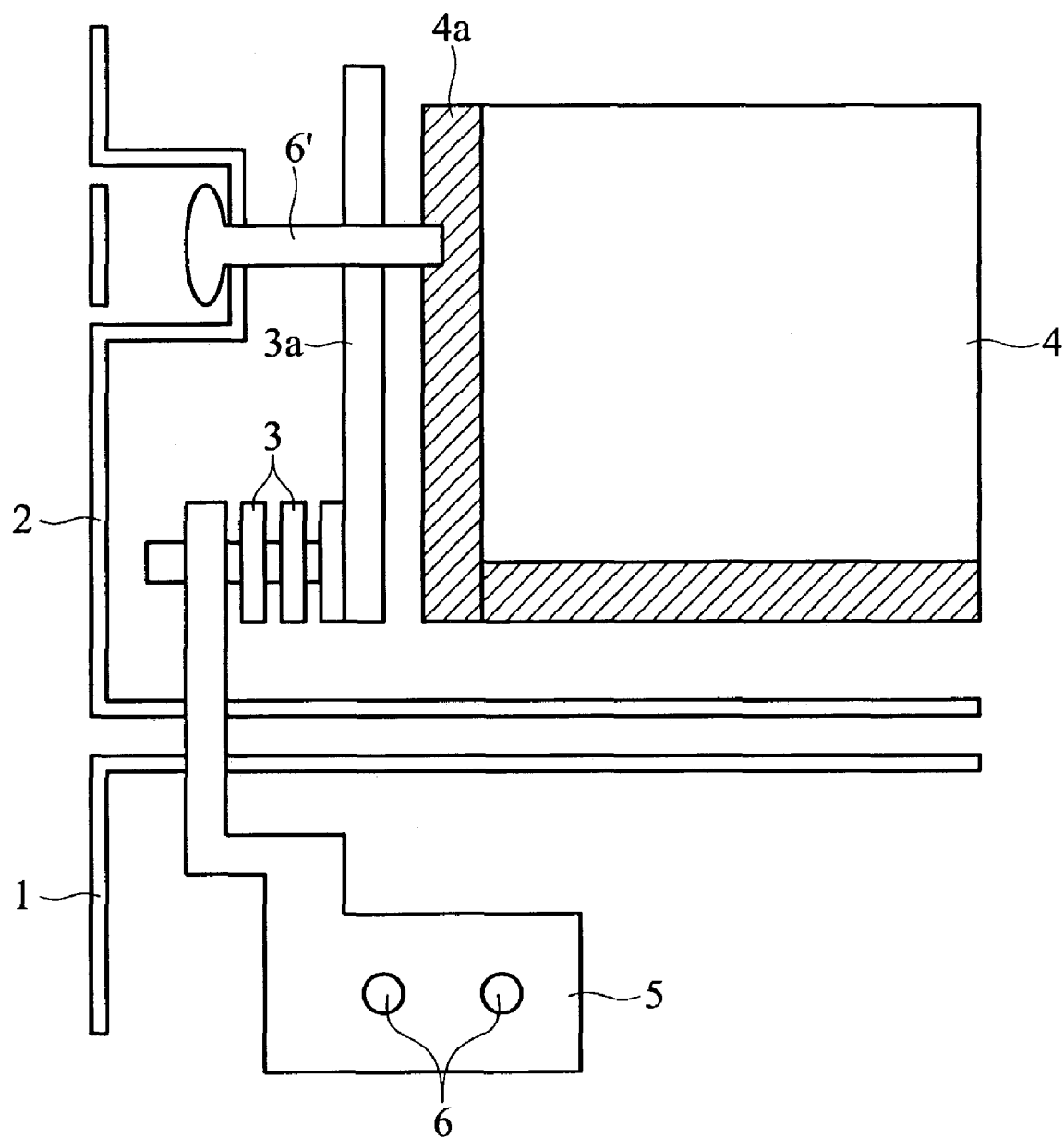
FIG. 1 is a sectional view of a conventional notebook computer.
Figure 2A:
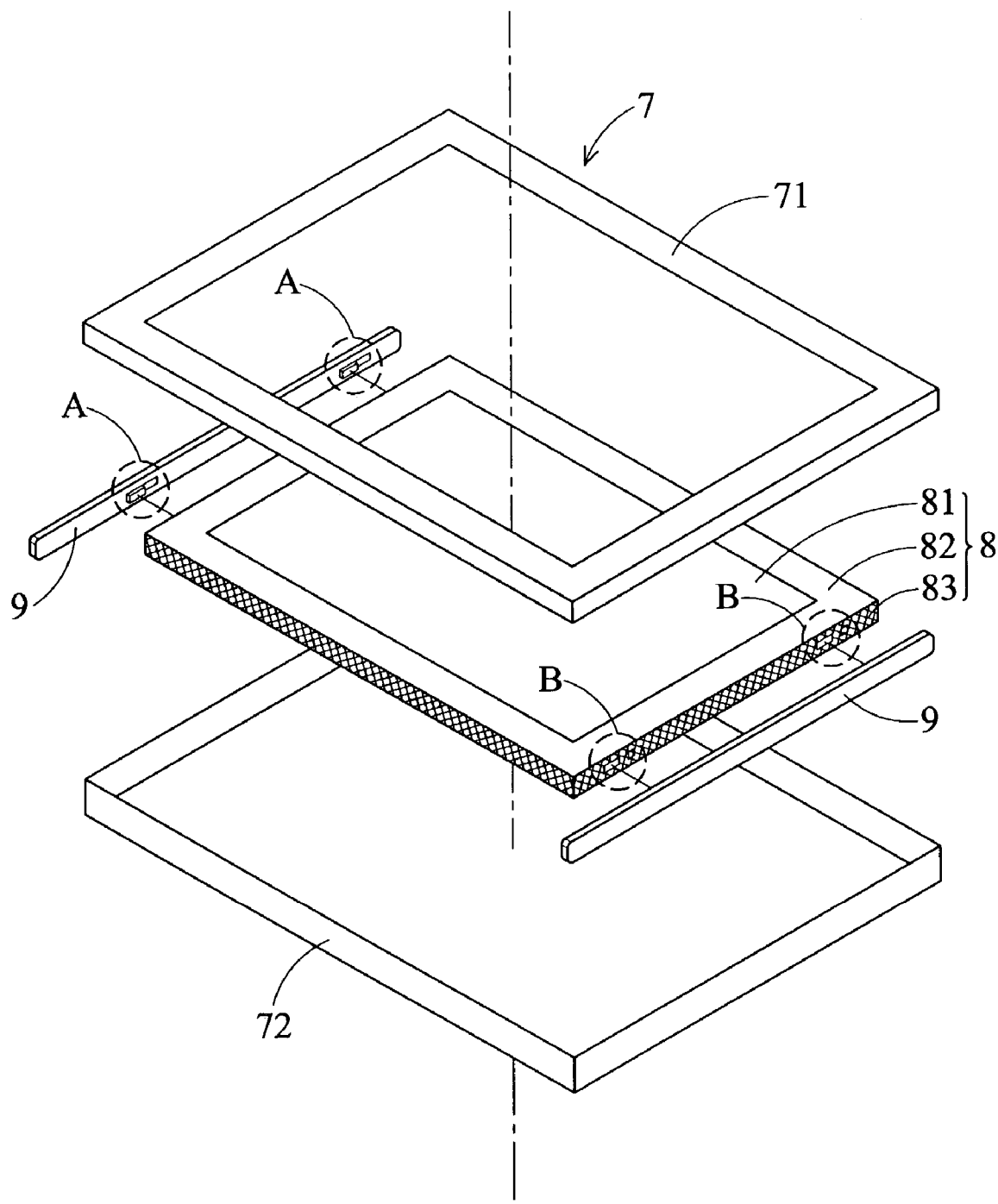
FIG. 2A is a perspective diagram of the LCD module connecting mechanism in accordance with the present invention.

Referring to FIG. 2A, the display unit 7, provided as the display device of the notebook computer, has an upper housing 71 and a lower housing 72. The LCD module 8 is disposed in the center of the display unit 7 including an LCD panel 81, a mold body 82 and a frame 83. As shown in FIG.

2A, the LCD panel 81 is disposed in the center of the mold body 82, wherein the mold body 82 is enclosed by the frame 83.

In general, the arm 9 is fixed on the upper housing 71 or the lower housing 72. The arm 9 is used to connect the display unit 7 and the main body of the notebook computer via a hinge (not shown). Thus, the display unit 7 pivots with respect to the main body of the notebook computer. As shown in FIG. 2A, particularly, two first joining portions A are disposed on a side of the arm 9 and the corresponding second joining portions B are disposed on a side of the LCD module 8. The LCD module 8 is secured in the display unit 7, by joining the first joining portion A and the second joining portion B.

Figure 2B:
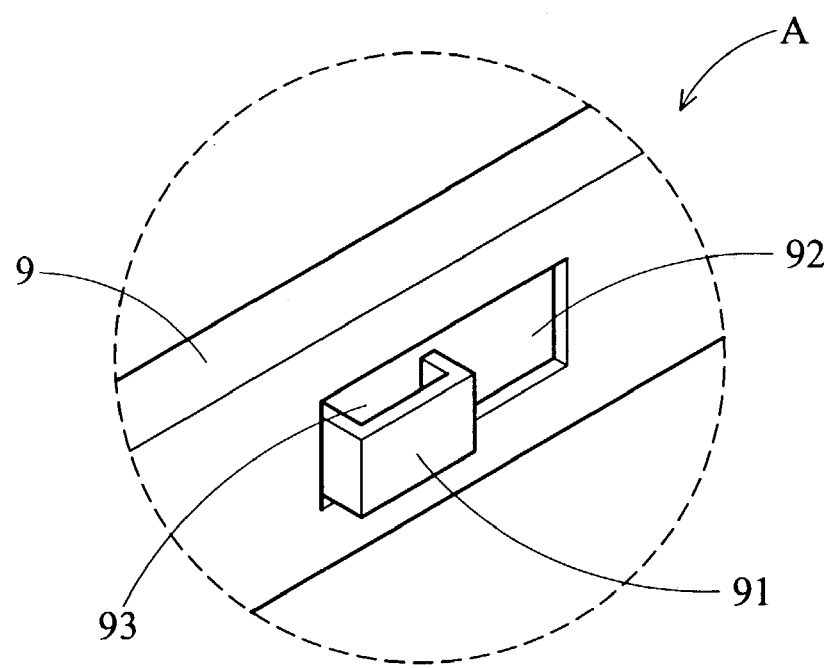
FIG. 2B is a large view perspective diagram of the first joining portion A as shown in FIG. 2A.

Referring to FIG. 2B, the first joining portion A has a depression 92 and a protrusive hook 91 opposite thereto. The hook 91 is C-shaped forming a slot 93 therein. As shown in FIG. 2A, two first joining portions A are provided on a side of the arm 9.

Figure 2C:
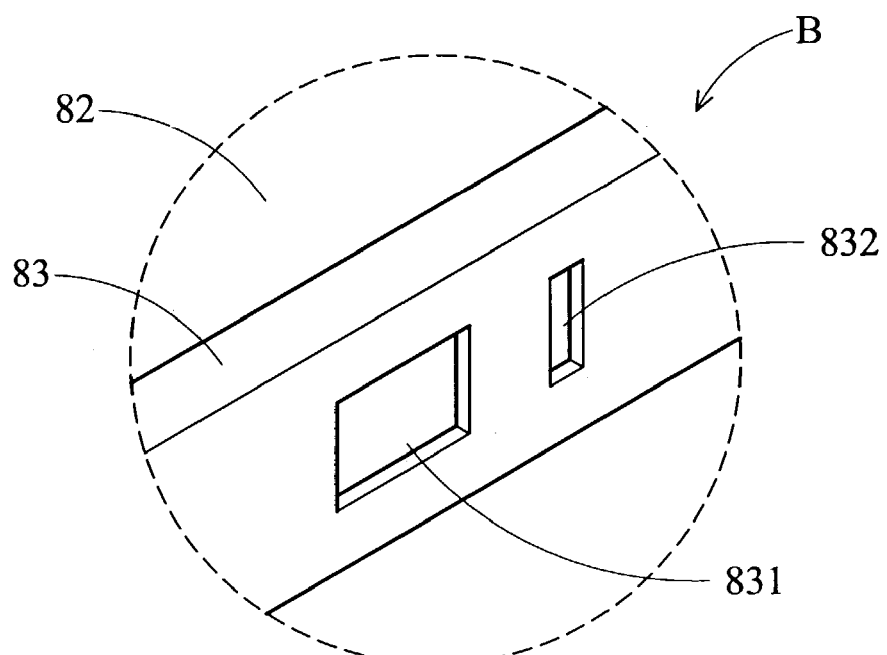
FIG. 2C is a large view perspective diagram of the second joining portion B as shown in FIG. 2A.

Referring to FIG. 2C, on a side of the LCD module 8, the second joining portion B has a first opening 831 and a second opening 832 disposed on the frame 83, wherein the first opening 831 is larger than the second opening 832 such that the hook 91 can easily pass through and be joined via these openings.

Figure 3:
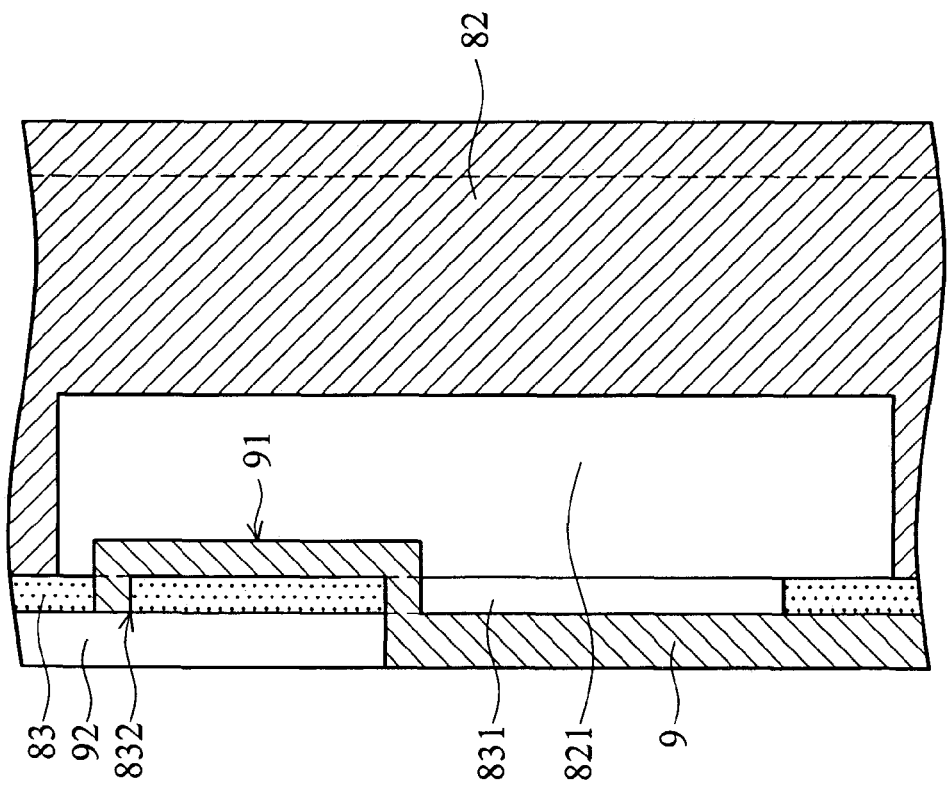
FIG. 3 is a sectional view of the first embodiment in accordance with the present invention.

FIG. 3 is a sectional view of the first embodiment in accordance with the present invention. A channel 821 corresponding to the first opening 831 and the second opening 832 is disposed on a side of the mold body 82. As shown in FIG. 3, the channel 821 connects the first opening 831 and the second opening 832 such that the first joining portion A and the second joining portion B are joined by the hook 91 passing through the first opening 831 and the channel 821 with the tail of the hook 91 located at the second opening 832.

Referring to FIG. 3, the hook 91 is located in the first opening 831, the channel 821 and the second opening 832 while joined. As the hook 91 is C-shaped and the tail thereof is, substantially equal to the size of the second opening 832, the LCD module 8 can be securely connected with the arm 9 by means of a hook.

Second Embodiment

As mentioned above, in FIG. 2A, the arm 9 is fixed on the upper housing 71 or the lower housing 72 to connect the main body of the notebook computer via a hinge (not shown). Moreover, with respect to FIG. 2B, the first joining portion A has a depression 92 and a protrusive hook 91 opposite to the depression 92, wherein the hook 91 is C-shaped with a slot 93 therein.

Figure 4:
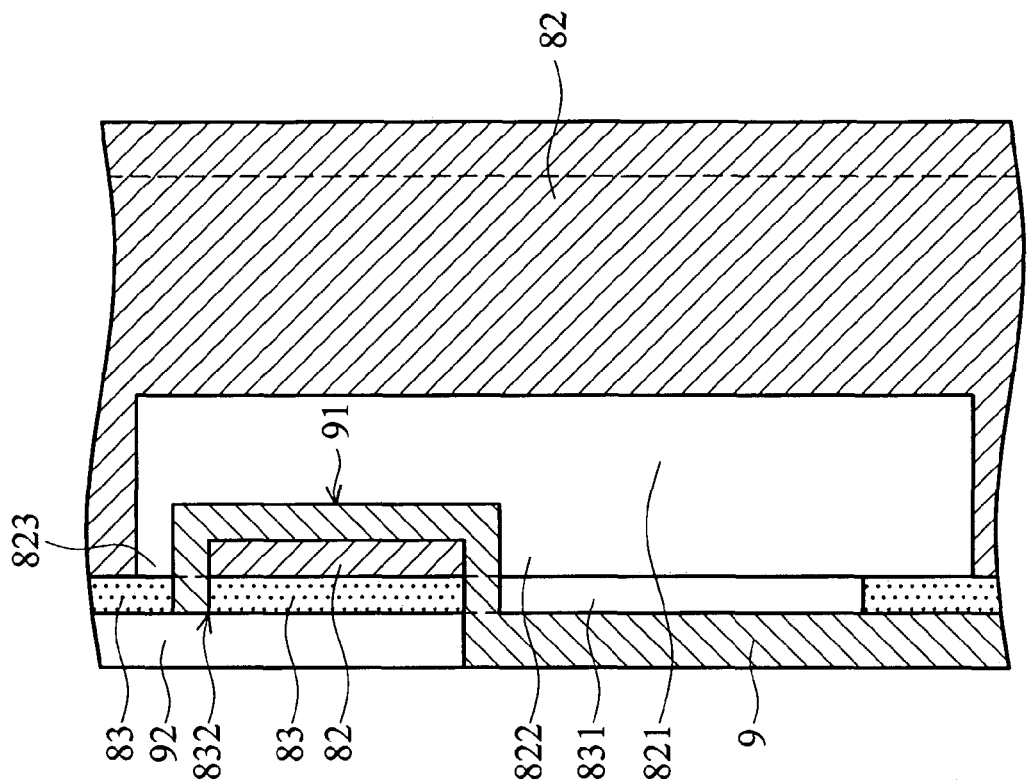
FIG. 4 is a sectional view of the second embodiment in accordance with the present invention.

Referring to FIG. 4, the frame 83 has a first opening 831 and a second opening 832, wherein the first opening 831 is larger than the second opening 832 such that the hook 91 can easily pass through and be joined via these openings. Particularly, the mold body 82 has a third opening 822 and a fourth opening 823 corresponding to the first opening 831 and the second opening 832 respectively. As shown in FIG. 4, the channel 821 disposed in the mold body 82 connects the third opening 822 and the fourth opening 823 such that the openings 831, 832, 822, 823 and the channel 821 are intercommunicated. Thus, the first joining portion A and the second joining portion B are joined by passing the hook 91 through the openings 831, 822 with the tail of the hook 9 located at the second and the fourth opening 823, 832. In FIG. 4, a part of the mold body 82 and the frame 83 are hooked within the slot 93 such that the LCD module 8 and the arm 9 are securely joined.

Additionally, such hook 91 of the first joining portion A can also be disposed on the inner surface of the upper or lower housing 71 or 72 to join to the second joining portion B. Therefore, the LCD module 8 can be secured in the display unit 7 by the hook disposed on the inner surface of the upper or lower housing 71 or 72 without the arm 9. Moreover, the hook 91 and the corresponding openings can be alternatively disposed on the LCD module 8 or the arm 9 as the mentioned first or second joining portion to join to each other such that the LCD module 8 and the arm 9 are securely connected.

In summary, the present invention provides an LCD module connecting mechanism joining the LCD module 8 and the arm 9 such that the LCD module 8 is secured in the display unit 7. As mentioned above, the LCD module 8 and the arm 9 are securely connected by joining the hook 91 of the first joining portion A to the second joining portion B. The present invention not only simplifies the assembly process and reduces cost due to the absence of screws, but also reduces the size of the electronic device.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An LCD module connecting mechanism for connecting an LCD module to an electronic device, comprising:
   an arm having a hook extending from a side thereof, the arm connected to the electronic device;
   a frame disposed on a side of the LCD module, having a first opening and a second opening, both on a lateral surface thereof; and
   a mold body enclosed by the frame, having a channel on a side thereof to receive the hook, wherein the arm and the frame are connected by inserting the hook through the first opening with the tail of the hook located at the second opening.

2. An LCD module connecting mechanism for connecting an LCD module to an electronic device, comprising:
   an arm having a hook extending from a side thereof, the arm connected to the electronic device;
   a frame disposed on a side of the LCD module, having a first opening and a second opening, both on a lateral surface thereof; and
   a mold body disposed in the LCD module, having a channel to receive the hook, the channel communicating the first and second openings;
   wherein the arm and the frame are connected by inserting the hook through the first opening with the tail of the hook located at the second opening.

3. The LCD module connecting mechanism as claimed in claim 2, wherein the size of the second opening is substantially equal to the tail of the hook.

4. The LCD module connecting mechanism as claimed in claim 2, wherein the first opening is larger than the second opening.

5. The LCD module connecting mechanism as claimed in claim 2, wherein the mold body has a third opening and a fourth opening connecting the channel, wherein the hook passes through the third opening, the channel and the fourth opening such that the frame is joined with the arm.

6. The LCD module connecting mechanism as claimed in claim 2, wherein the arm further has a depression disposed thereon opposite to the hook.

7. The LCD module connecting mechanism as claimed in claim 2, wherein the hook is C-shaped.

8. The LCD module connecting mechanism as claimed in claim 2, wherein the electronic device is a main body of a notebook computer.

9. An LCD module connecting mechanism for connecting an LCD module to an electronic device, comprising:
   a housing covering the electronic device, the housing having a hook extending from a side thereof;
   a frame disposed on a side of the LCD module, having a first opening and a second opening, both on a lateral surface thereof; and
   a mold body enclosed by the frame, having a channel on a side thereof to receive the hook, the channel communicating the first and second openings, wherein the housing and the frame are connected by inserting the hook through the first opening with the tail of the hook located at the second opening.

10. The LCD module connecting mechanism as claimed in claim 9, wherein the mold body has a third opening and a fourth opening connecting the channel, wherein the hook passes through the third opening, the channel and the fourth opening such that the frame is joined with the housing.

* * * * *